Patented Apr. 7, 1953

2,634,285

UNITED STATES PATENT OFFICE

2,634,285
ACYLOXY SILANES

John B. Rust, East Hanover, and Homer van Beuren Joy, Montclair, N. J., assignors, by direct and mesne assignments, of one-half to Montclair Research Corporation, Montclair, N. J., a corporation of New Jersey, and one-half to Ellis-Foster Company, a corporation of New Jersey No Drawing. Application March 27, 1947, Serial No. 737,714

3 Claims. (Cl. 260—448.2)

1

This invention relates to organo-silicon derivatives and particularly to acyloxy silanes, and to processes of making the same, as well as to compositions and methods of utilizing such derivatives.

It is known that when an alkyl magnesium halide is allowed to react with silicon tetrachloride or ethyl ortho-silicate and the reaction products treated with water, alkyl silicon-ols, usually in polymerized condition, are formed. These materials tend to polymerize spontaneously by dehydration, even at room temperature. They may be made either by the two step process of first forming the Grignard reagent and reacting it with the desired silicon derivative, or by the one step process described in application Serial No. 509,017, filed November 3, 1943, by Rust and MacKenzie, entitled "Organo-Silicon Derivatives and Process of Making Same" in which the silicon derivative such as silicon halide is reacted with a halo-hydrocarbon in the presence of metallic magnesium.

Among the objects of the present invention is the production of derivatives of these silicon-ols regardless of the methods used in the production of the latter.

Other objects of this invention include the production of stable organo-silicon derivatives having a wide variety of uses in the arts, such as in the plastics, paint, textile fields and the like.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with this invention, it has been found that the silicon-ols, either as such, or in dehydrated or partially polymerized condition, can be acylated, as by conversion into esters, which are quite stable at room temperatures under ordinary conditions but which may be converted into polymeric substances as by the application of heat or catalysts, particularly acid or basic substances, or by a combination of such methods. These polymeric materials have high or low degrees of complexity depending upon the number of organic radicals such as alkyl groups, and the size of the organic radicals such as alkyl groups, attached to the silicon atom. To illustrate the acylates produced in accordance with this invention, the esters will be referred to as the most significant.

The esters may be formed in a number of different ways, as illustrated in the examples given hereinafter. These esters may be produced in the pure state or they can be made partially polymeric esters. In the pure state they may take the configuration given in the following formula

in which R is a hydrocarbon radical having at least 8 carbon atoms, R' is a hydrocarbon radical, and $n$ is not greater than 3. Where a single substituent hydrocarbon group is attached to the silicon the formula will be

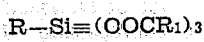

Esterified polymers produced from such acyloxy derivatives may have the configuration

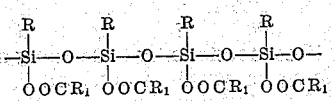

in which formulas R and $R_1$ may be the same or different organic substituents, particularly aliphatic and carbocyclic such as alkyl, unsaturated aliphatic, aryl, aralkyl, or cycloaryl groups including methyl, ethyl, propyl, isopropyl, butyl, isobutyl, amyl, hexyl, heptyl, octyl, vinyl, allyl, butenyl, cyclohexyl, propargyl, phenyl, tolyl, xenyl, and substituted aliphatic and carbocyclic groups such as chlorpropyl and chlorphenyl.

In some cases, the esters, such as the acetates, cure or polymerize by the elimination of acid anhydride, such as acetic anhydride.

Thus alkyl acyloxy silanes, aryl acyloxy silanes, and related derivatives having substituent groups as set forth above may be produced in which compounds the acyl group is derived from an aliphatic or aromatic carboxylic acid which may be a polybasic acid. The compounds containing hydrocarbon radicals attached to the silicon where there are at least 8 carbon atoms including both aliphatic and aromatic or carbocyclic are particularly valuable because the presence of the higher groups give properties to the compounds which distinguish them from the presence of lower groups therein. Such compounds, therefore, covered and included in the present case include alkyl acyloxy silanes where the alkyl group has at least 8 carbon atoms, and where the acyl group is either aliphatic or aromatic and may be polybasic, including the compounds like octyl acyloxy silanes, octyl acetoxy silanes, etc.

The following examples illustrate the process of making the silicon derivatives of the present invention and the products derivable therefrom. In those examples, all proportions are in parts by weight.

Example 1.—A solution of ethyl magnesium bromide in ether was formed from 4.86 parts of magnesium, 86.4 parts of ethyl ether and 24 parts of ethyl bromide. This solution was added dropwise to 26.1 parts of silicon tetrachloride in 36 parts of ether. When the exothermic reaction had subsided, the solution was boiled for 1 hour, then poured onto cracked ice. The ether solution was washed with water until neutral, then dried over anhydrous sodium sulfate. 47 parts of acetic anhydride were then added and the ether distilled off. The temperature was taken to 100° C., and held for several hours. During this time the temperature rose somewhat higher and some acetic acid distilled over. The acetates so formed were stable at 100° C., but on pouring a film and baking at 120° C., a clear, hard lacquer coating was obtained in a short time.

Example 2.—A solution of butyl magnesium bromide in ethyl ether was made using 4.86 parts of magnesium, 86.4 parts of ether, and 30 parts of n-butyl bromide. The solution was added dropwise to 30 parts of silicon tetrachloride in 36 parts of ethyl ether. When all reaction was over the solution was poured onto cracked ice, washed until neutral with water and dried over anhydrous sodium sulfate. 20 parts of acetic anhydride were added and the ether distilled off. The temperature was taken to 100° C. for 2½ hours. The product of a viscous liquid, having the approximate composition of $$(C_4H_9)_{1.13}Si(OOCCH_3)_{2.87}$$

A film of this material was poured on a glass plate and baked at 100° C. It became hard and tough in a short time, acetic anhydride being eliminated during baking as could be detected by the odor. A portion of the butyl silicyl acetate was dissolved in xylene to form a 5% solution. This solution was used to coat steel wool. After drying the wool was exposed to humid, summer shop conditions for 2 months without signs of corrosion developing.

Besides using anhydrides to form the esters, they may be formed in other ways, as by using acid chlorides.

Example 3.—A solution of butyl magnesium bromide in ethyl ether was made from 4.86 parts of magnesium, 86.4 parts of ethyl ether and 30 parts of n-butyl bromide. The solution was added dropwise to 28.3 parts of silicon tetrachloride in 36 parts of ether. When the reaction was over the material was poured on crushed ice, washed until neutral with water, then dried over anhydrous sodium sulfate. 50 parts of xylene were added and the ether distilled off. To 21 parts of this xylene solution containing 5 parts of butyl silicols, there was added 11 parts stearoyl chloride. The mixture was heated at 100° C. for 4½ hours. Hydrochloric acid was evolved during the reaction. When cool, the butyl silicyl stearate mixture tended to crystallize out of the xylene.

This latter material may advantageously be used at a water-repellent for textiles.

Example 4.—A solution of butyl magnesium bromide in ethyl ether was made from 4.86 parts of magnesium, 86.4 parts of ethyl ether and 30 parts of n-butyl bromide. This solution was added dropwise to 31 parts of silicon tetrachloride in 36 parts of ethyl ether. When the reaction was over, the mixture was poured on crushed ice, washed with water and dried over anhydrous sodium sulfate. 50 parts of xylene were added and the ether distilled off. 23.5 parts of the resulting solution containing 5 parts of butyl silicols and 5 parts of maleic anhydride were heated under reflux condenser for 2 hours. The xylene was then distilled off. A sample of the butyl silicyl maleate, which was an extremely viscous liquid, was poured onto a glass plate and baked at 140° C. A hard film resulted. To the remainder of the maleate, 1.9 parts of diethylene glycol were added and heating at 160° C. continued. A hard resinous material was obtained.

Example 5.—15.6 parts of the xylene solution of butyl silicols described in Example 4 and containing 3.33 parts of butyl silicols having the approximate composition of $(C_4H_9)_{1.1}Si(OH)_{2.9}$ were mixed with 4 parts of acetyl chloride and heated under a reflux condenser for 3 hours. Hydrochloric acid was evolved copiously at first and then more slowly. A solution of polymeric acetate resulted which was completed stable on inspection from time to time during a two months' period. No deposit could be detected in the container. A film from the solution baked up hard and glossy at 120° C. in a short time.

Example 6.—36 parts of ethyl ether, 2 parts by volume of n-amylbromide and 3 parts of metallic magnesium were mixed and 0.5 part by volume of methyl iodide added. After a catalytic amount of the Grignard reagent had been formed, a mixture of 19 parts of n-amyl bromide and 21 parts of silicon tetrachloride were run in at a rate sufficient to keep the reaction mixture warm. 18 parts additional ethyl ether were added and the mixture refluxed for 1 hour. 43 parts of hexane solvent were added and the mixture poured on crushed ice, washed and dried. 15.5 parts of beta-chloropropionyl chloride were added and the mixture refluxed for 5 hours. Hyrochloric acid was evolved during the reaction and a small amount of brown solid separated from the solution. The solution was decanted and diluted with hexane to give a solution of the amyl silicyl-beta-chloropropionate. A film of the material hardened very slowly on baking at 140–150° C.

Example 7.—Ethyl butane orthosiliconate (butyl triethoxy silane) $(C_4H_9Si(OC_2H_5)_3)$ 27.5 parts were mixed with 18.5 parts of phthalic anhydride. The mixture was heated at 150° C. for 5 hours during which time a reaction occurred to form a product having the probable formula $$C_4H_9Si(OC_2H_5)_2(OOC.C_6H_4.COOC_2H_5)$$

On washing the above with sodium hydroxide solution and neutralizing the wash water no precipitate was obtained. This indicated that a complete reaction had occurred.

The above material may be used advantageously as a plasticizer for various resinous and plastic materials.

Example 8.—11 parts of metallic magnesium and 108 parts of ethyl ether were mixed and a trace of methyl iodide added to form some methyl magnesium iodide. 51 parts of silicon tetrachloride and 64 parts of methyl iodide were mixed and added to the magnesium and ether at such a rate that the ether continued to boil. The mixture was then heated for 1 hour at boiling. The material was poured onto crushed ice, washed with water and dried. A solution of $(CH_3)_{1.5}Si(OH)_{2.5}$ was obtained. This was diluted with dioxan and 1 mole of phthalic anhydride added for each mole of methyl silicol. The solution was refluxed for 4 hours. A small amount of solid remained undissolved. A film was poured on a plate and gave on baking at 120° C. a white, amorphous mass.

Many times it is desirable to carry out the esterification reaction in the presence of a tertiary amine which serves to remove the hydrogen chloride when acid chlorides are employed.

*Example 9.*—A methyl amyl silicol was made by adding a mixture of 1 mole methyl iodide, 1 mole amyl bromide and 2 moles silicon tetrachloride to metallic magnesium in ethyl ether. The solution was heated for 1 hour, then poured onto crushed ice, washed and dried. One mole of this mixed alkyl silicol was mixed with 1 mole of pyridine and 1 mole of benzoyl chloride added. The pyridine served to remove the hydrogen chloride rapidly from the reaction. The mixture was heated for two hours at boiling. It was filtered free of pyridine hydrochloride and diluted with ethyl acetate to give a solution of methyl amyl hydroxy-silicyl benzoate.

When applied to cotton from a solvent and baked the product of the above example gave an excellent water-repellent effect.

*Example 10.*—1 gram mole of butyl triethoxy silane and 1 gram mole of benzoyl chloride and 1 gram mole of pyridine were mixed and heated together at 150° C. for 5 hours. A reaction product was produced having the probable formula

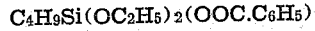
$C_4H_9Si(OC_2H_5)_2(OOC.C_6H_5)$

*Example 11.*—1 gram mole of butyl triethoxy silane and 3 gram moles of acetic anhydride were reacted by being heated together at 150° C. for 5 hours. A reaction product was produced having the probable formula $C_4H_9Si(OOC.CH_3)_3$.

*Example 12.*—1 gram mole of octyl triethoxy silane and 3 gram moles of acetic anhydride were heated together at 150° C. for 5 hours. A reaction product was produced having the probable formula $C_8H_{17}Si(OOC.CH_3)_3$.

*Example 13.*—1 gram mole of octyl triethoxy silane and 1 gram mole of phthalic anhydride were heated together at 150° C. for 5 hours. A reaction product was produced having the probable formula

$C_8H_{17}Si(OC_2H_5)_2(OOC.C_6H_4.COOC_2H_5)$

In preparing the esters, the proportions of esterifying agent to silicon-ol may vary. Small ratios of esterifying agent to silicon-ol results in only a small number of hydroxyls being esterified. Desirably an excess of esterifying agent is used to assure esterification of all of the hydroxy groups.

While pyridine has been referred to above to illustrate the tertiary amines, other examples are quinoline, alpha picoline, dimethyl benzyl amine, dimethyl aniline, trimethyl-, triethyl-, etc. amine, ethyl morpholine.

As the hydrocarbon substituents in the formulas given above, there may be present alkyl, aryl, olefinyl, alkenyl, alkynyl, arenyl, arynyl, alicyclic, cycloaromatic, aralkyl, derivatives as illustrated by methyl, ethyl, propyl, butyl, amyl, hexyl, heptyl, octyl, vinyl, allyl, butenyl, the radicals from acetylene, methyl acetylene, propyl acetylene, cyclohexyl, benzyl, phenyl, tolyl, xenyl, chlorphenyl, styryl, and radicals from such derivatives as phenyl acetylene, etc.

The silicon derivatives of the present invention may be used in many different ways. They may be used as lacquers and adhesives, either alone or in admixture with other completely reacted or potentially reactive resins. Such resins include natural resins such as rosin, copal, shellac, etc., as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives including the esters of acrylic and methacrylic acids, etc.; also as intermediates for resins and plastics; as, or in, baking lacquers, etc.

The silicon derivatives of the present invention as illustrated above may be used as textile finishing compositions either alone or in solution in solvents to produce special effects such as waterproofing, creaseproofing, wrinkleproofing, to improve the drape of cloth, etc.; which compositions may include resins, etc., as set forth above.

They may also be used in making solid silicon plastics. The silicon derivatives either alone or in admixture with other additives including resins as set forth above, may be mixed with various inorganic or organic fillers and used for hot molding, extruding, casting, etc. Objects having excellent strength and highly resistant to water and organic solvents may thus be produced. The inorganic fillers include both fibrous and non-fibrous materials such as the clays like bentonite, mica, asbestos, glass, or cellulosic materials such as paper, cotton, wood flour, etc.

The silicon derivatives prepared in accordance with the present invention may be used as lubricating oils or may be used as additives to both hydrocarbon oils such as lubricating oils and also for inclusion with vegetable oils, particularly the drying oils such as linseed oil, and China-wood oil, and the semi-drying oils such as soya bean oil, etc., as well as non-drying oils including castor oil, etc. Thus the silicon derivatives may be blended or cooked with the vegetable oils. They may serve as modifying agents for fatty oils, and be used in drying oil varnishes. With the lubricating oils, they may serve as high-pressure lubricants.

These silicon derivatives may be used in rustproofing and corrosion resisting coatings either alone or in solvents or vehicles, with or without additions or inclusions of resins, oils, etc., as set forth above.

In view of their excellent electrical properties, the derivatives may be used either per se, or as varnishes, etc. in producing coatings or articles, or coated articles for electrical insulation, etc. These silicon derivatives may also be used in the production of laminated products for bonding together two or more sheets of the same or different organic or inorganic materials.

The silicon derivatives are also utilizable as plasticizers as well as binders, and their utilization for such purposes may be controlled by the number of alkyl or aryl or similar substituents introduced into the derivative.

Any of the silicon derivatives referred to herein including the silicon-ols, their ethers, esters, etc., per se or in dehydrated, polymerized or partially polymerized condition may be used in the production of novel types of printing inks as a substitute for the resin or similar solids content thereof, either in whole or in part. In like manner, they may be used in floor coverings as binders for compositions used in that art, or as surface or other coatings thereon.

Having thus set forth our invention, we claim:
1. An octyl acyloxy silane.
2. An octyl acetoxy silane.
3. Octyl silicon acetate.

JOHN B. RUST.
HOMER van BEUREN JOY.

REFERENCES CITED

The following references are of record in the file of this patent:

UNITED STATES PATENTS

| Number | Name | Date |
|---|---|---|
| 2,386,259 | Norton | Oct. 9, 1945 |
| 2,386,441 | Daudt | Oct. 9, 1945 |
| 2,405,988 | Barry | Aug. 20, 1946 |
| 2,431,878 | McGregor | Dec. 2, 1947 |

OTHER REFERENCES

Beilstein: Handbuck der Organischen Chemie, 4th ed., vol. IV, pages 627–28.

Friedel et al.: Am. der Chem., vol. 145, page 177 (1868).